(12) United States Patent
Abrams et al.

(10) Patent No.: US 8,402,062 B2
(45) Date of Patent: Mar. 19, 2013

(54) DATA EXPORT/IMPORT FROM MULTIPLE DATA SOURCE TO A DESTINATION DATA REPOSITORY USING CORRESPONDING DATA EXPORTERS AND AN IMPORTER

(75) Inventors: Peter Abrams, Portland, OR (US); Vik Anantha, Portland, OR (US)

(73) Assignee: McKesson Health Solutions LLC, San Francisco, CA (US)

( * ) Notice: Subject to any disclaimer, the term of this patent is extended or adjusted under 35 U.S.C. 154(b) by 0 days.

(21) Appl. No.: 12/876,806

(22) Filed: Sep. 7, 2010

(65) Prior Publication Data

US 2011/0113074 A1 May 12, 2011

Related U.S. Application Data

(63) Continuation of application No. 11/739,512, filed on Apr. 24, 2007, now Pat. No. 7,792,793.

(51) Int. Cl.
*G06F 17/00* (2006.01)

(52) U.S. Cl. ......... 707/791; 707/802; 707/822; 707/828
(58) Field of Classification Search ........... 707/600–899
See application file for complete search history.

(56) References Cited

U.S. PATENT DOCUMENTS

| | | | |
|---|---|---|---|
| 2001/0047372 A1* | 11/2001 | Gorelik et al. | 707/514 |
| 2003/0093770 A1 | 5/2003 | Fernandez | |
| 2005/0015360 A1* | 1/2005 | Cras et al. | 707/2 |
| 2006/0085393 A1 | 4/2006 | Modesitt | |
| 2007/0294389 A1 | 12/2007 | Bauer et al. | |

\* cited by examiner

*Primary Examiner* — Isaac M Woo
(74) *Attorney, Agent, or Firm* — Sutherland Asbill & Brennan LLP

(57) ABSTRACT

Embodiments of the present invention provide methods and systems for exporting data from a number of data sources using a number of corresponding data exporters, and importing the exported data into a destination data repository using a data importer. In various embodiments, the data exporters may be automatically generated using a data exporter generator adapted to generate the data exporters in view of data schemas of the data sources.

10 Claims, 5 Drawing Sheets

DATA EXPORT/IMPORT FROM MULTIPLE DATA SOURCE TO A DESTINATION DATA REPOSITORY USING CORRESPONDING DATA EXPORTERS AND AN IMPORTER

CROSS-REFERENCE TO RELATED APPLICATION

The present application is a continuation of non-provisional application Ser. No. 11/739,512, filed Apr. 24, 2007, entitled "DATA EXPORT/IMPORT FROM MULTIPLE DATA SOURCE TO A DESTINATION DATA REPOSITORY USING CORRESPONDING DATA EXPORTERS AND AN IMPORTER," now U.S. Pat. No. 7,792,793, issued Sep. 7, 2010, the entire specification of which is hereby incorporated by reference in its entirety for all purposes, except for those sections, if any, that are inconsistent with this specification

TECHNICAL FIELD

Embodiments of the present invention relate to the field of data processing, and, in particular, to methods and apparatuses for exporting data from a number of data sources into a destination data repository.

BACKGROUND

With advances in integrated circuit, microprocessor, networking, and communication technologies, an increasing number of devices, in particular, digital computing devices, are being interconnected to solve government and business problems to increase efficiency and reduce cost. However, the application of advanced information technology (IT) is often blocked or made difficult by the existence of legacy data, maintained in various incompatible data source and data formats. Migration and consolidation of the data into a common repository with common data format often become an essential pre-requisite. But, in many governmental and business problems, the volume of data, data sources and data format are so overwhelming, it is virtually impossible to address the problem manually or in a piecewise effort.

Improving the efficiency and possibly reducing the cost for provision of medical service is a good example. The problem has been substantially under attended to for so long, there are massive volumes of physician, patient and other medical service related demographic data residing a plethora heterogeneous databases of incompatible data formats. Consolidating these demographic data into a common demographic data repository with common data formats is for all practical purpose essential for any provider and medical services related organization to attempt to apply advanced information technology (IT) to improve the efficiency and possibly reduce the cost for provision of medical service.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description is presented, in part, in terms of operations performed by a processor-based device, using terms such as exporting, funneling, reading, validating, transforming, importing and the like, consistent with the manner employed by those skilled in the art. Quantities may take the form of electrical, magnetic, or optical signals capable of being stored, transferred, combined and/or otherwise manipulated through mechanical, electrical, and/or optical components of a processor-based device. Thus, none of these operational terms in the specification, including the claims, are to be construed as manual operations.

The various operations may be described as multiple discrete steps in turn, in a manner that may be helpful in understanding embodiments of the present invention; however, the order of description should not be construed to imply that these operations are order dependent.

The description may use various combinatorial phrases A/B, A and/or B etc. If used, for the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may also use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
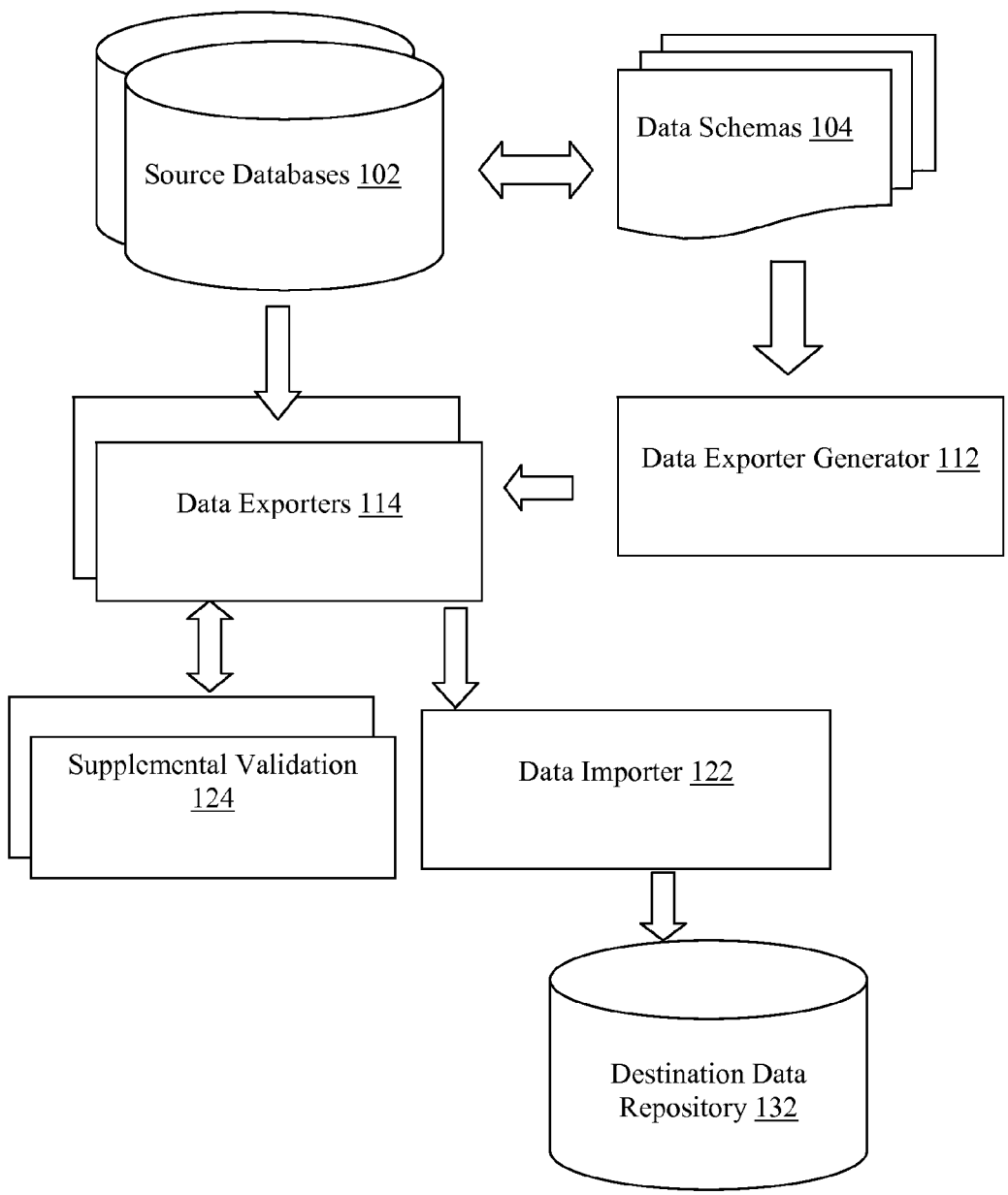
FIG. 1 illustrates an overview of the data exporter/importer system of the present invention, in accordance with various embodiments.

FIG. 1 is a diagram illustrating an overview of the present invention in accordance with various embodiments. As illustrated, the embodiments include data exporter generator 112 and data importer 122 adapted to cooperate with each other to facilitate exporting of data from data sources 102 and importing the exported data into destination data repository 132. Data exporter generator 112 and data importer 122 are adapted to allow data sources 102 to be heterogeneous. Data sources 102 may be databases or extract files of databases. Further, data sources 102 may provide similar or different data in similar or different data formats. However, data stored in destination data repository 132 may have a unified data format, further the data may be organized or modeled.

Data schemas 104 are employed to describe the data of data sources 102, typically include their formats. Data schemas 104 may also be employed to describe to data exporter generator 112, the validation to be performed on data exported out of data sources 102. Typically, one data schema 104 is employed per different data source 102.

Data stored in destination data repository 132 may be organized or modeled. The organization or model is made known to data importer 122, allowing data importer 122 to be able to perform organizational and model processing on the data being imported, to enable the data to be stored in the destination data repository 132 in the desired organization/modeled manner.

Data exporter generator 112 is employed to automatically generate corresponding data exporters 114 for data sources 102 to export data out of the data sources 102. Data export generator 112 generates data exporters 114 in view of the data description info provided by data schemas 104. Data export generator 112 further generates each data exporter 114 to use data importer 122 to import its exported data into destination data repository 132, allowing data exporters 114 to leverage on the knowledge data importer 122 has about destination data repository 132 and thus alleviate data exporters 114 from having to have such knowledge, to effectuate to desired export/import.

As will be described in more detail below, for the embodiments, each data exporter 114 is endowed with the ability to validate data exported out of data sources 102 as prescribed by data schemas 104. In various embodiments, data schemas 104 may also be employed to instruct data exporter generator 122 to invoke supplemental validation routines 124 to perform supplemental validations on the data being exported out of data sources 102. Typically the validations to be performed by supplemental validation routines 124 may be more complex validations. Thus, it is relatively more efficient to perform the more complex validations through supplemental processing than to describe them to data exporter generator 122 via data schemas 104 to enable data exporter generator 122 to generate the validations inline.

In various embodiments, data exporter generator 122 may also be endowed with the data formats of destination data repository 132 to enable data exporter generator 122 to provide inline transformation of the data exported from data sources 102 to prepare them for import into destination data repository 132.

Resultantly, embodiments of the invention enable efficient export of data from a plethora of heterogeneous data sources, and import the exported data into a destination data repository having its own data format, organization and/or model.

Figure 2:
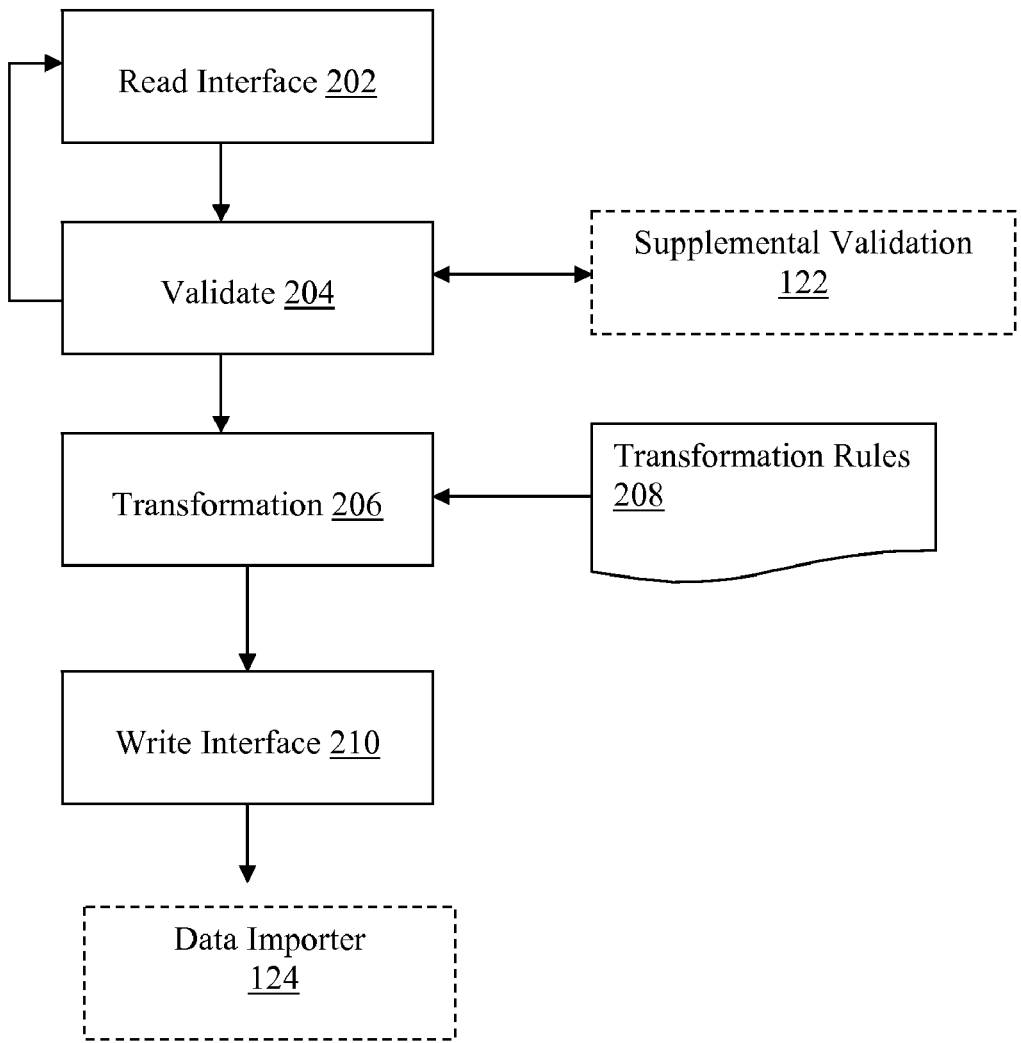
FIG. 2 illustrates a data exporter of FIG. 1 in further details, in accordance with various embodiments.

FIG. 2 illustrates selected function blocks of a data exporter generated by data exporter generator, in accordance with various embodiments. As illustrated, data exporter 114 includes read interface 202, validation block 204, transformation block 206, transformation rules 208, and write interface 210, operationally coupled to each other and other external functions as shown. Read interface 202 is configured to read data out of a corresponding data source 102. Validation block 204 is configured to selectively validate data read out of the corresponding data source 102, inline or by invoking supplemental validation processing 122. Transformation block 206 is configured to transform the data exported from the corresponding data source 102, e.g. from one data format to another, in particular to a data format of destination data repository 132. For the embodiments, the transformation may be performed in accordance with the provided transformation rules. Typically, the transformations are performed after validations if validations are required. Write interface 210 is configured to write the (validated and/or transformed) data into destination data repository 132 via data importer 130, leveraging on data importer 130's knowledge of destination data repository 132, allowing the data to be stored in an organized/modeled manner.

Figure 3:
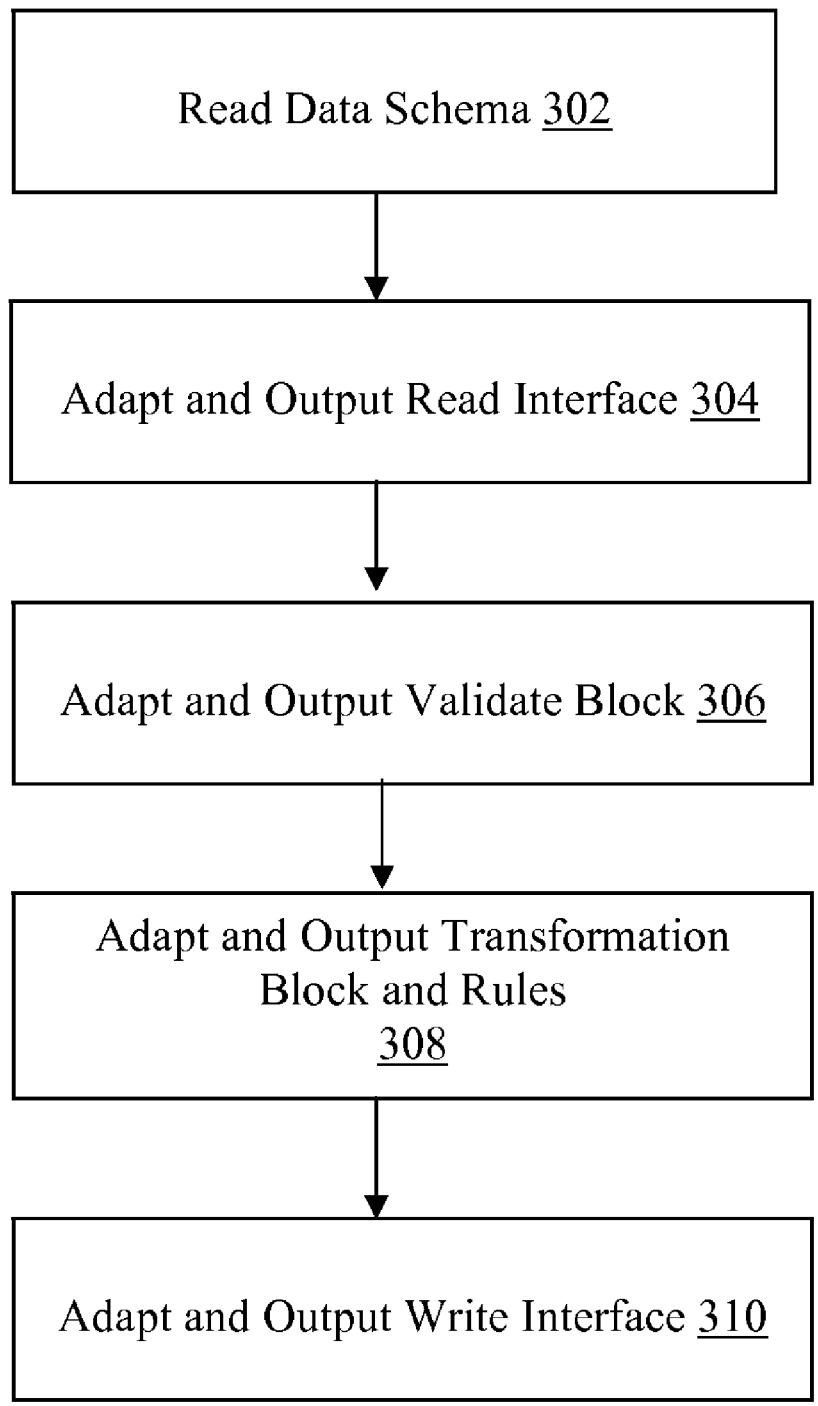
FIG. 3 illustrates selected operations of the data exporter generator, in accordance with various embodiments of the present invention.

FIG. 3 illustrates selected operations of data exporter generator, in accordance with various embodiments. As illustrated, for the embodiments, on invocation or provided with a data schema 104 of a data source 102, data exporter generator 112 reads the data schema 104 to obtain description of the data, including e.g. the valid data values for various data, and/or validation routines to be invoked to validate various types of data, block 302.

Thereafter, based at least in part on the description obtained, data exporter generator 112 configures and output a read interface 202 for the data exporter 114 being generated, block 304. The read interface 202 is configured o read one or more data fields, records and/or files from the corresponding data source 102.

Next, based also at least in part on the description obtained, data exporter generator 112 configures and output a validation block 204 for the data exporter 114 being generated, block 306. The validation block 204 is configured to selectively validate the data exported from the corresponding data source 102, either inline, or invoking one or more supplemental validation routes 124 to be provided to complement the data exporter 114.

Similarly, based also at least in part on the description obtained, data exporter generator 112 configures and output a transformation block 206 and transformation rules 208 for the data exporter 114 being generated, block 308. The transformation block 206 is configured to selectively transform the data exported from the corresponding data source 102 in accordance with transformation rules 208.

Finally, based also at least in part on the description obtained, data exporter generator 112 configures and output a write block 210 for the data exporter 114 being generated, block 310. The write block 206 is configured to write the exported (and processed) data into destination data repository 132 using data importer 122.

Accordingly, data exporters 114 for a plethora of data sources 102 (which may be heterogeneous) may be automatically generated, in view of the data schemas 104 of the data sources 104. Further, data exporters 114 may all leverage on knowledge of destination data repository 132 imparted on data importer 122. Thus, exports and imports of large amount of data from a large number of heterogeneous data sources into a common destination data repository may be more efficiently performed.

Figure 4:
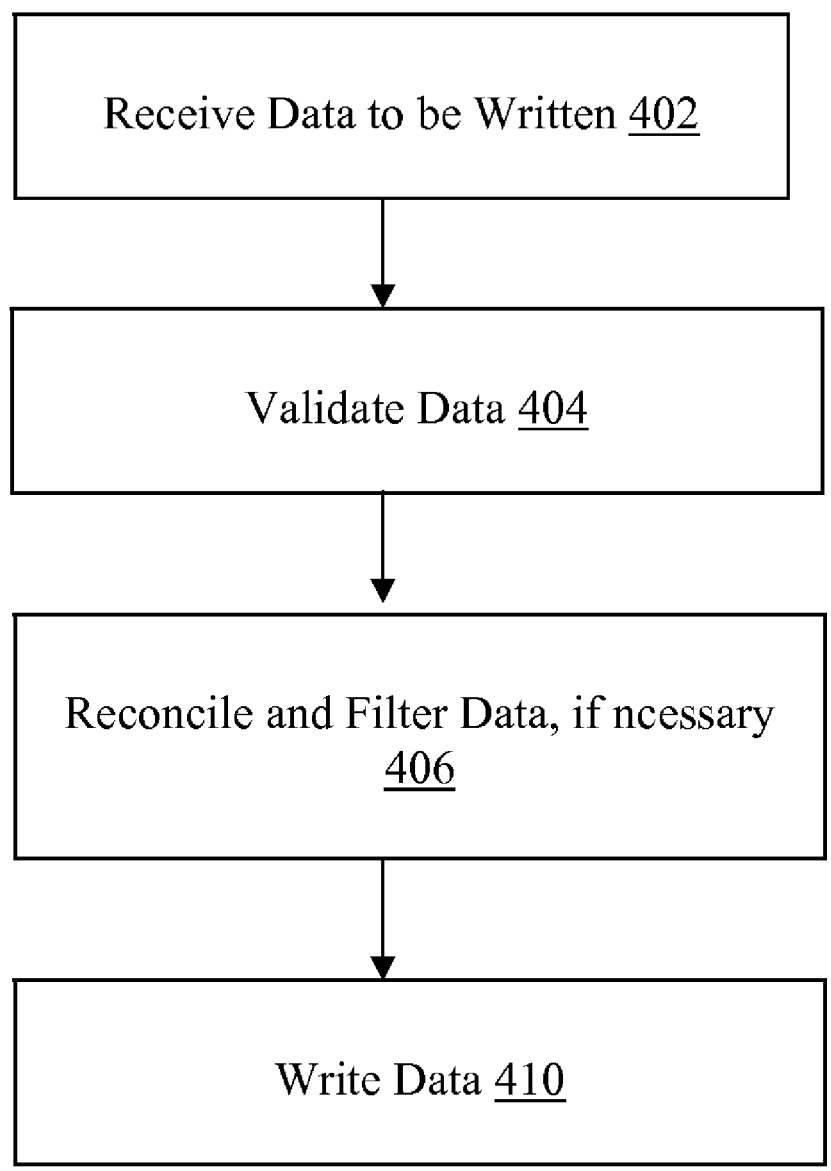
FIG. 4 illustrates selected operations of the data importer, in accordance with various embodiments of the present invention.

FIG. 4 illustrates selected operations of data importer in accordance with various embodiments. As illustrated, for the embodiments, on invocation or receipt of data to be written into destination data repository 132, block 402, data importer 122 may optionally validate the data again, block 404, before allowing the data to be written into destination data repository 132. Thereafter, for the embodiments, data importer 122 may reconcile and/or filter the data, block 406, before writing the data into destination data repository 132, if the data are to be written into destination data repository 132. In various embodiments, data importer 122 may be endowed with the logic to discard redundant data, or data deemed to be inconsistent with other data. For example, in a medical service provider demographic application, data importer 122 may be endowed to discard duplicate service addresses, but allow multiple unique addresses of different service locations.

Finally, if the received data are to be written into destination data repository 132, data importer 122 writes the data into destination data repository 132.

Figure 5:
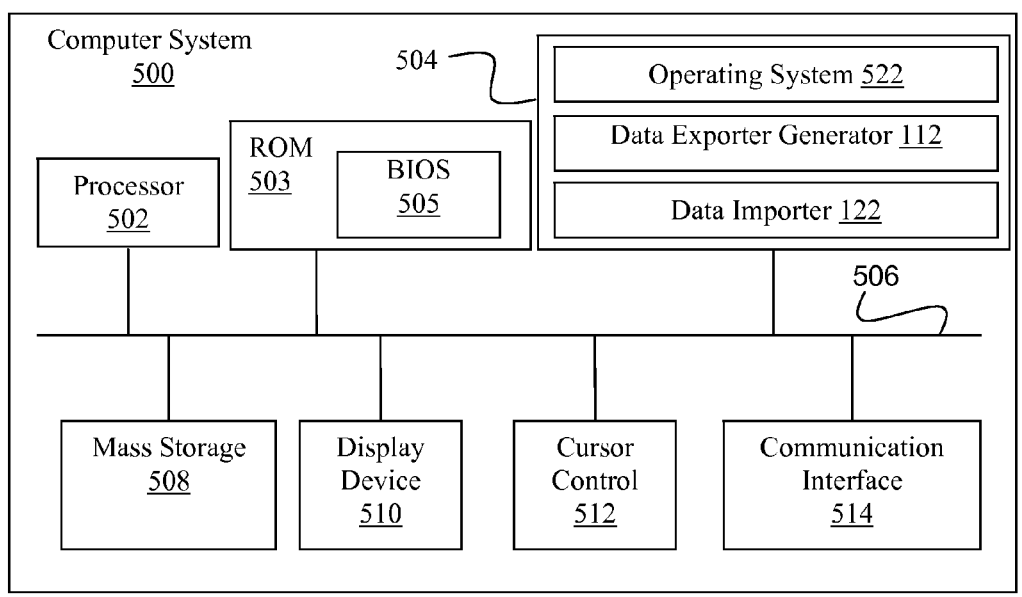
FIG. 5 illustrates an exemplary computer system suitable for use to practice the present invention, in accordance with various embodiments of the present invention.

FIG. 5 illustrates an exemplary computer system in accordance with embodiments of the present invention. As shown, example computer system 500 includes one or more processors or processor cores 502, ROM 503 including basic input/output system (BIOS) 505, and system memory 504 coupled to each other via "bus" 506. Also coupled to "bus" 506 are nonvolatile mass storage 508, display device 510, cursor control device 512, and communication interface 514. During operation, memory 504 may also include working copies of operating system 522, data exporter generator 112 and data importer 122. Data exporter generator 112 and data importer 122 may be endowed to perform the various operations as described earlier. In various embodiments, memory 504 may also include one or more applications (not shown), with which data exporter generator 112, and data importer 122 are coupled.

Example Application to Medical Service Provider Demographic Data Export and Import In various embodiments, the data sources are heterogeneous medical service provider demographic data sources of a one or more medical service providers, with the medical service provider demographic data stored in the medical service provider demographic data sources in a variety of different formats, moreover, the data may be partially redundant, and the destination data repository is a common medical service provider data model as seen by health plans, providers, as well as payers, and so forth.

The model may provide for providers having several addresses designated for different purposes. For example, Place of Service/Location of Care and Contracting Address are frequently different addresses. These different addresses are frequently tracked by different departments in different databases. The model may also allow for payers to divide up their network into several regions based on place of service/location of Care. Providers in different regions are managed by different databases in different databases. Further, the model may provide for provider groups with a strict hierarchical relationship, a peer to peer relationship or a combination of the two exist in most Payer networks. These relationships can be either organizational or contractual in nature.

In various embodiments, the medical service provider demographic data sources are extract files consisting lines of delimited fields. Each line represents one provider. The delimiter is set by a property, but is nominally the pipe ('|') character. Some fields allow multiple values (e.g. the provider may have multiple alternate names), in which case the tilde ('~') is used as a second-level delimiter. If a third-level delimiter is necessary, then it is the carrot ('^').

Further, the provider records contain two types of data single-value fields variable-length lists of field sets For example, the provider name may be a single-value field. However, the provider's address may be composed of multiple files (line 1, line 2, city, state, zip, and so forth). Further, a provider may have multiple addresses. Hence, the list of addresses may be a variable-length list of a set of fields. Further, for single-valued fields, each field is assigned a position. Position 1 begins with the first character in a column.

In various embodiments, the data schemas may be in the form of a spreadsheet containing three worksheets a first worksheet that specifies versioning information of the data schema a second worksheet specifying the organization of the data source, e.g. table organizations include row and column information of a relational database or file format of an extract file; and a third worksheet specifying how the exported data are to be represented in the destination data repository, optional including valid data values or validation routines to be invoked to validate the exported data.

For example, the following example definition defines three single-valued fields, Provider ID, Provider Name and Country.

| Field # | Group # | Field Name | Allow Multiple | Required | Validation Rules | If Validation Fails |
|---|---|---|---|---|---|---|
| 1 | | Provider ID | N | Y | 6 characters | Do Not Import |
| 2 | | Provider Name | N | Y | Not Null | Log, Import bad data |
| 3 | | County | N | Y | Not Null | Log, Import bad data |

With an N in the Allow Multiple column, the field will only accept single values.

An extract file data source that meets this specification may look like the following:

14432A|Regional Neurosurgery, PC|Jefferson

16545T|A. Reisman, MD|Lincoln

Below is another example, which is extension of the earlier example to include multiple-value fields.

| Field # | Group # | Field Name | Allow Multiple | Required | Validation Rules | If Validation Fails |
|---|---|---|---|---|---|---|
| 1 | | Provider ID | N | Y | 6 characters | Do Not Import |
| 2 | | Provider Name | N | Y | Not Null | Log, Import bad data |
| 3 | | County | N | Y | Not Null | Log, Import bad data |
| 4 | | Keyword | Y | N | | |

The Keyword field has a Y in the Allow Multiple column signifying that multiple values are accepted.

An extract file data source that meets this specification may look like the following:

14432A|Regional Neurosurgery, PC|Jefferson|neuro~par
16545T|A. Reisman, MD|Lincoln|intmed~par In this case, Regional Neurosurgery will have two keywords: "neuro" and "par." Dr. Reisman will also have two keywords: "intmed" and "par."

In various embodiments, a data schema may specific multiple field sets, e.g., some fields such as address can contain multiple values and are composed of multiple fields. Below is yet another example, which is a further extension of the earlier example to include multiple field sets.

| Field # | Group # | Field Name | Allow Multiple | Required | Validation Rules | If Validation Fails |
|---|---|---|---|---|---|---|
| 1 | | Provider ID | N | Y | 6 characters | Do Not Import |
| 2 | | Provider Name | N | Y | Not Null | Log, Import bad data |
| 3 | | County | N | Y | Not Null | Log, Import bad data |
| 4 | | Keyword | Y | N | | |
| 5 | 1 | Address Line 1 | Y | N | | |
| 6 | 1 | Address Line 2 | Y | N | | |
| 7 | 1 | City | Y | N | | |
| 8 | 1 | State | Y | N | | |
| 9 | 1 | ZIP Code | Y | N | | |

As before, a Y in the Allow Multiple column indicates that multiple values are accepted for that data item. When multiple fields have the same group number such as the Address, each field in the group may be required to contain the same number of items. If there are two "Address Line 1" entries (separated by tildes), then there must also be two "Address Line 2," "City," "State," and "ZIP Code" entries. Each entry is related between fields based on position. The second "Address Line 1" will be joined with the second "Address Line 2," the second "City," and so on to form the complete second address.

An extract file data source that meets this specification may look like the following:
14432A|Regional Neurosurgery, PC|Jefferson|neuro~par|123 W 23rd St~456 S Broadway St|~|Hillsboro~Beaverton|OR~OR|97123~97006
16545T|A. Reisman, MD|Lincoln|intmed~par|43332 NE 223rd|Suite 500|Portland|OR|197223
In this example,
Regional Neurosurgery has two addresses:
  1. 123 W 23$^{rd}$ St
     Hillsboro, Oreg. 97123
  2. 456 S Broadway St
     Beaverton, Oreg. 97006
  Address Line 2 is blank for both addresses. Field 6 just contains "~". The left side of the tilde is the first Address Line 2, which is blank, and the right side of the tilde is the second Address Line 2, which is also blank. Since there are two addresses, there must be two Address Line 2 entries (as opposed to leaving field 6 completely blank)
Dr. Reisman only has one address, so no tildes appear.

In various embodiments, to allow for greater flexibility, the second-level and third-level delimiter characters may be used in single-valued fields. This rule also extends to the use of third-level delimiters in lists of non-list values (that is, fields in which multiples are allowed and in which the validation rule begins with "One of:").

In various embodiments, the names and formats of certain fields may be pre-determined. Further, the embodiments may require that: If destination data repository accommodates a list of values, then the data source schema must also allow a list of values. For example
  All Address fields (for both Provider Addresses and Provider Contact Addresses) are lists.
  Address Types and Contact Types are lists of lists.
  Tax IDs are lists.
  Specialties are lists.
  Keywords are lists.
  Child Provider Ids (and thus Parent Provider ids) are lists.

In various embodiments, the specification of subprovider hierarchies may be achieved in any of several ways. The destination data repository may utilize lists of child provider ids to build subprovider hierarchies. The data schema may complementarily support specification of subprovider hierarchies either by lists of child provider ids, or by lists of parent provider ids. In either case, the data schema may require the field "Child Provider Ids" in order to build subprovider hierarchies. Optionally, the data schema may include an additional "Parent Provider Ids" field. If so, the data schema may specify translation of "Parent Provider Ids" into "Child Provider Ids".

In various embodiments, a "Validation Rules" and a "If validation fails . . . " column in a spreadsheet form data schema may be employed help to determine the validation behavior of a data exporter to be generated. In various embodiments, the following syntaxes may be employed:
Types
  One of: [<category>:]<name>: [{<value>, <value>, <value>, . . . }]
  List of: [<category>:]<name>: [{<value>, <value>, <value>, . . . }]
<category> is one of
  "Choreo Extensible Type"
  "Adapter Predefined Type"
  "Customer Defined Type" (by default, if no <category> is present)<
<name> is a single identifier, made up of letters, numbers, underscores, hyphens.
If category is "Extensible Type", then name must be one of
  Provider
  Address
  Name
  Contact
  User
  Attachment
  Memo
If category is "Exporter Predefined Type", then name must be one of the types defined below in the "Built-in validation rules" section.

If category is "Extensible Type", then during online validation, actual destination data repository values are used. During offline validation, if values are present in the spec, then they are used, otherwise no validation is performed.

If more than 1 type definition of the same name is present, then the first one is used. Empty type definitions defer to same-named definitions with content.

Type names and values are always caseless.

Length
    <n> characters
    length: <n> characters
    length: <min>-to-<max> characters "If validation fails . . . " Syntax All validation failures are logged, so there is no need to specify a logging action.

Upon failure, the following strings are recognized:
    do not import
    use invalid value
    use null
    use "<default value>"

Built-In (aka Predefined) Validation Rules

The data exporter generator provides several general-purpose built-in validation rules for use by the customer. They are:

US_Zip_Code
    5 digits (ie, ddddd)
    9 digits (ie, ddddddddd)
    ddddd-dddd Tax_ID
    9 digits (ie, ddddddddd)
    ddd-dd-dddd (SSN using hyphens)
    ddd dd dddd (SSN using spaces)
    dd-ddddddd (EIN using hyphens)
    dd ddddddd (EIN using spaces)

Date_format_MM-DD-YYYY
    MM-DD-YYYY

Yes_No

US_State_2_letter_Abbreviation

In various embodiments, one exporter is employed to export and import the place of service address and exporter is employed to export and import the contracting address subject to different business rules. In various embodiments, different exporters are employ to export and import provider demographic data from different regions. In various embodiments, the exporters are employed to establish and maintain the provider grouping.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
reading a data schema using a data exporter generator operated by one or more computing devices, wherein the data schema provides a data description that describes data that is associated with the data schema and that is stored in the data source; and
automatically generating a data exporter by the data exporter generator, wherein the data exporter is generated based at least in part on the data description provided by the data schema, and wherein the data exporter is adapted to export the data associated with the data schema and provide the exported data to a data importer associated with a destination data repository,
wherein the data importer is adapted to receive the exported data, selectively process the received data, and write the selectively processed data into the destination data repository,
wherein the destination data repository is a common medical service provider demographic database and the data source comprises a plurality of heterogeneous medical service provider demographic data sources, and
wherein the data exporter generator is adapted to generate a plurality of different data exporters that includes the data exporter, and wherein the plurality of different data exporters are adapted to export and facilitate importing of providers' places of service address and contracting address and to export and facilitate importing of demographic data from different regions.

2. The method of claim 1, wherein the automatically generating the data exporter comprises the data exporter generator automatically generating a read interface for the data exporter to read the data associated with the data schema out of the data source.

3. The method of claim 2, wherein the automatically generating the read interface comprises the data exporter generator automatically adapting a generic read interface based at least in part on the data description provided by the data schema, wherein the data description comprises at least one data format associated with the data described by the data schema.

4. The method of claim 2, wherein the automatically generating the data exporter further comprises the data exporter generator automatically generating a validation block for the data exporter to validate the data read out of the data source by the data exporter in order to generate validated data.

5. The method of claim 4, wherein the automatically generating the validation block comprises the data exporter generator automatically modifying a generic validation block based at least in part on the data description provided by the data schema, wherein the data description includes a description of valid data values for the data.

6. The method of claim 5, wherein the automatically modifying the generic validation block comprises the data exporter generator automatically modifying the generic validation block based at least in part on the data description in order to invoke one or more supplemental validation routines for providing supplemental validation, wherein the data description includes information associated with the one or more supplemental validation routines.

7. The method of claim 4, wherein the automatically generating the data exporter further comprises the data exporter generator automatically generating a transformation block and a set of transformation rules, wherein the data exporter is adapted to transform the validated data based at least in part on the set of transformation rules to generate transformed data.

8. The method of claim 7, wherein the automatically generating the data exporter further comprises the data exporter generator automatically generating a write block, wherein the data exporter is adapted to invoke the data importer and provide the transformed data to the data importer for processing and storage into the destination data repository using the write block.

9. The method of claim 2, wherein the data source comprises single value data and one or more lists having variable lengths, wherein each list comprises a plurality of fields.

10. The method claim 1, wherein each of the plurality of different data exporters is generated based at least in part on a respective corresponding data schema that describes respective data stored in a respective one of the plurality of data sources.

* * * * *